United States Patent [19]
Luke et al.

[11] Patent Number: 6,131,087
[45] Date of Patent: Oct. 10, 2000

[54] METHOD FOR AUTOMATICALLY IDENTIFYING, MATCHING, AND NEAR-MATCHING BUYERS AND SELLERS IN ELECTRONIC MARKET TRANSACTIONS

[75] Inventors: James O. Luke, Dearborn; Mark L. Fischer, Essexville; Sue-Anne M. Sweeney, Dearborn, all of Mich.

[73] Assignee: The Planning Solutions Group, Inc., Dearborn, Mich.

[21] Appl. No.: 09/186,764

[22] Filed: Nov. 5, 1998

Related U.S. Application Data

[60] Provisional application No. 60/064,540, Nov. 5, 1997.

[51] Int. Cl.[7] .................................................. G06F 17/60
[52] U.S. Cl. .................................. 705/26; 705/27; 705/37
[58] Field of Search .................................. 705/26, 53, 75, 705/80, 10, 27, 37, 400, 20; 395/671

[56] References Cited

U.S. PATENT DOCUMENTS

| | | | |
|---|---|---|---|
| 3,573,747 | 4/1971 | Adams et al. | 705/37 |
| 3,581,072 | 5/1971 | Nymeyer | 705/37 |
| 4,412,287 | 10/1983 | Braddock, III | 705/37 |
| 4,674,044 | 6/1987 | Kalmus et al. | 705/37 |
| 4,789,928 | 12/1988 | Fujisaki | 705/37 |
| 4,799,156 | 1/1989 | Shavit et al. | 705/26 |
| 4,903,201 | 2/1990 | Wagner | 705/37 |
| 5,077,665 | 12/1991 | Silverman et al. | 705/37 |
| 5,136,501 | 8/1992 | Silverman et al. | 705/37 |
| 5,592,375 | 1/1997 | Salmon et al. | 705/7 |
| 5,615,269 | 3/1997 | Micali | 705/75 |
| 5,655,088 | 8/1997 | Midorikawa et al. | 705/37 |
| 5,689,652 | 11/1997 | Lupien et al. | 705/37 |
| 5,754,939 | 5/1998 | Herz et al. | 707/501 |
| 5,758,328 | 5/1998 | Giovannoli | 705/26 |
| 5,794,207 | 8/1998 | Walker et al. | 705/26 |
| 5,794,219 | 8/1998 | Brown | 705/37 |
| 5,873,071 | 2/1999 | Ferstenberg et al. | 705/37 |
| 5,924,082 | 7/1999 | Silverman et al. | 705/37 |
| 5,950,178 | 9/1999 | Borgato | 705/37 |
| 5,970,475 | 10/1999 | Barnes et al. | 705/27 |
| 6,014,643 | 1/2000 | Minton | 705/37 |
| 6,014,644 | 1/2000 | Erickson | 705/37 |
| 6,044,363 | 3/2000 | Mori et al. | 705/37 |
| 6,055,519 | 4/2000 | Kennedy et al. | 705/80 |

FOREIGN PATENT DOCUMENTS

| | | | |
|---|---|---|---|
| 0407026 A2 | 1/1991 | European Pat. Off. | G06F 15/24 |
| 0411748 A2 | 2/1991 | European Pat. Off. | G06F 15/24 |

OTHER PUBLICATIONS

Gotlieb, Leo, "Looking Past the Year 2000", CMA Management Magazine, vol. 71, Issue 9, pp. 11–14, Nov. 1997.
Wilder, Clinton, "Power Brokers Get on the Web", Information Week, Issue 655, Nov. 3, 1997, p.96.
Wilder, Clinton, "What's Your Bid?", Information Week, Issue 656, pp. 54–60, Nov. 10, 1997.

*Primary Examiner*—Paul R. Lintz
*Assistant Examiner*—John W. Hayes
*Attorney, Agent, or Firm*—MacMillan, Sobanski & Todd, LLC

[57] ABSTRACT

A computer implemented method for market participants for automatically identifying and matching offer data with solicitation data, the solicitation data stored in a solicitations data base, the method comprising the steps of: receiving offer data consisting of numerical linear ranges defining a lower point, an upper point, and a preferred point for each dimension of the offer data storing the received offer data in a database; comparing points for each dimension of the stored offer data to corresponding dimensions of the solicitation data to: identify solicitations with matching preferred points, identify solicitations with preferred points having a near match with the offer data when the upper point and the preferred point of the offer data are between the upper point and the preferred point of the solicitation data, and identify solicitations with preferred points within corresponding ranges to the offer data when at least one of the lower point, the upper point, and the preferred point of the offer data is between the lower point and the upper point of the solicitation data; transmitting the identified solicitations with matching preferred points, near matching preferred points, and preferred points within corresponding ranges to originator of the offer data.

19 Claims, 11 Drawing Sheets

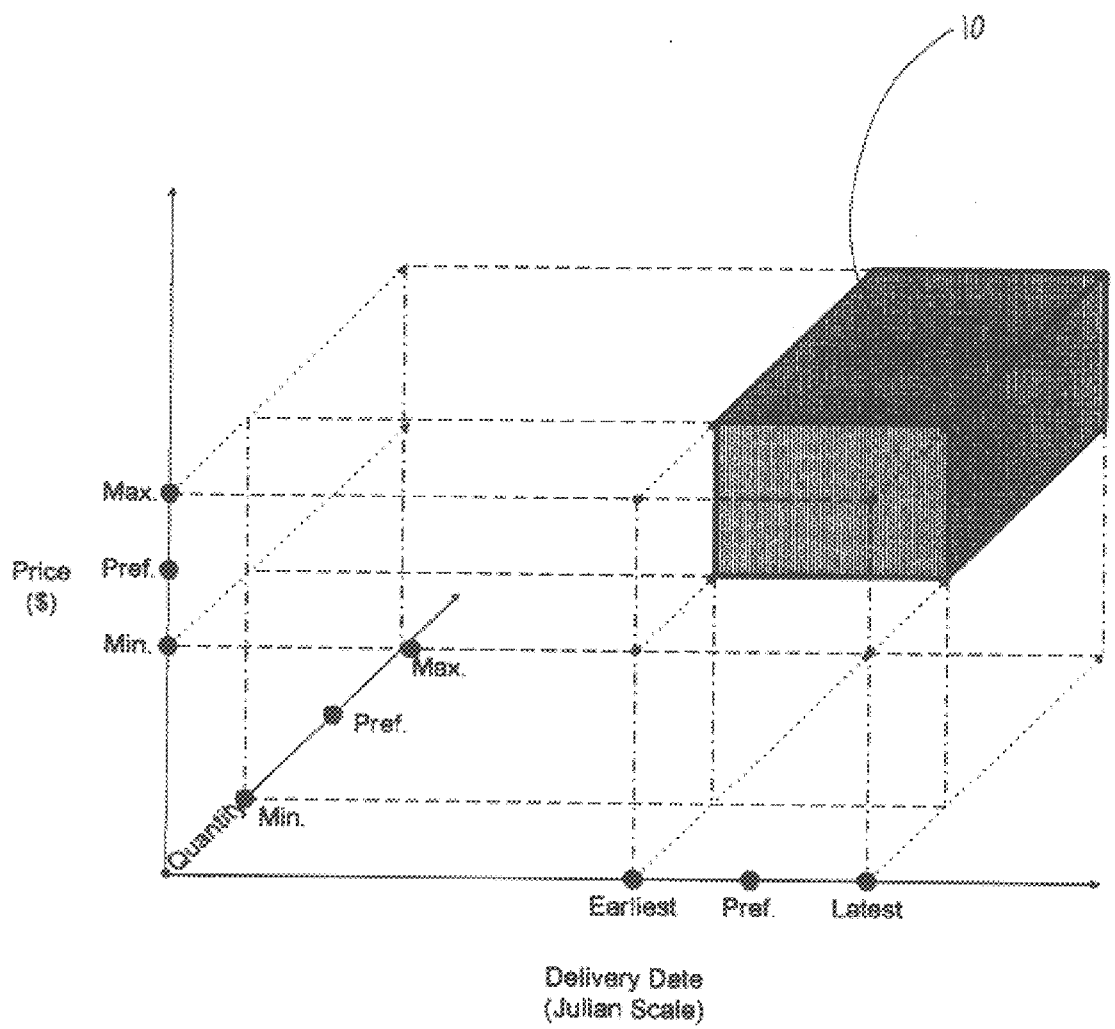

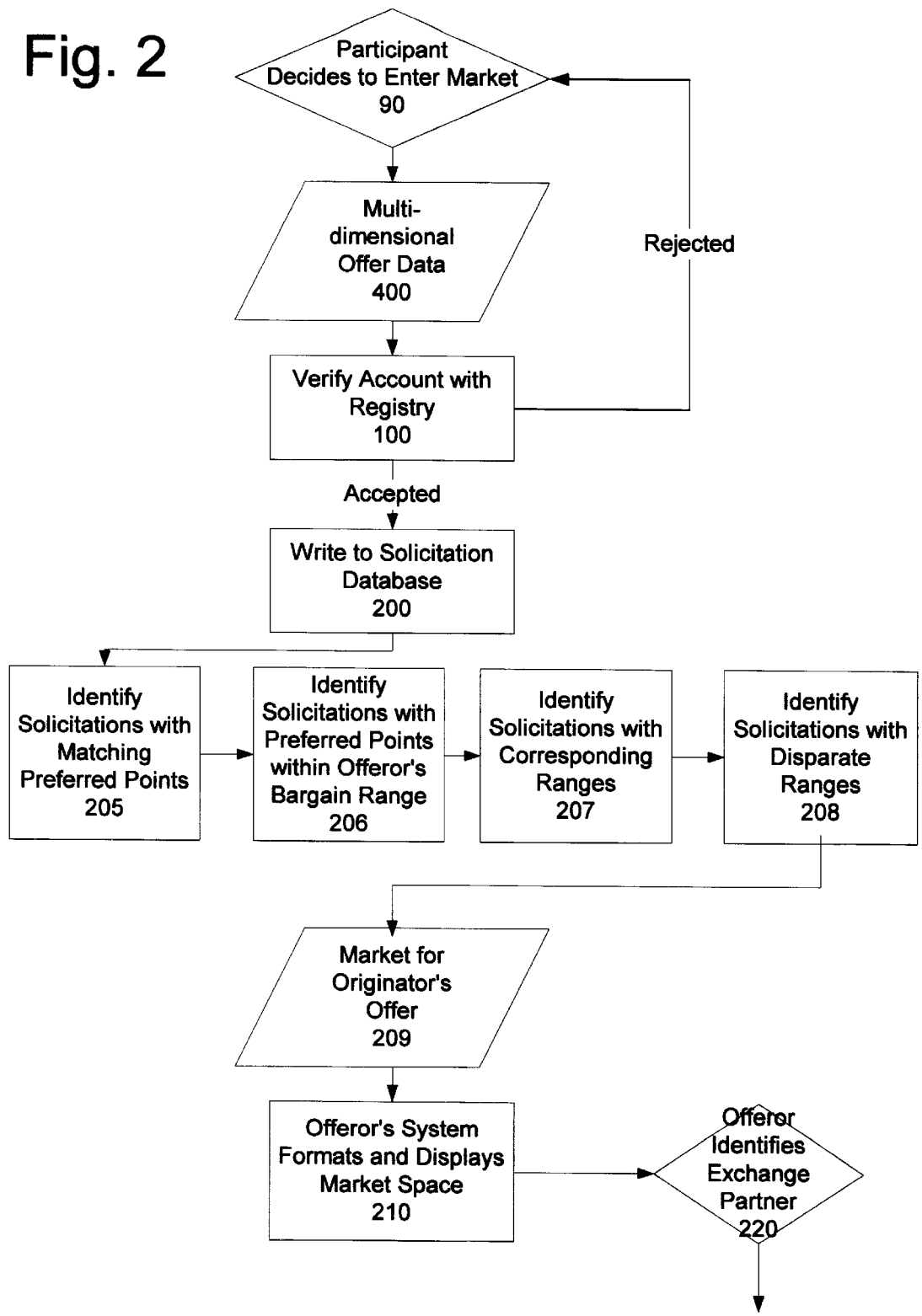

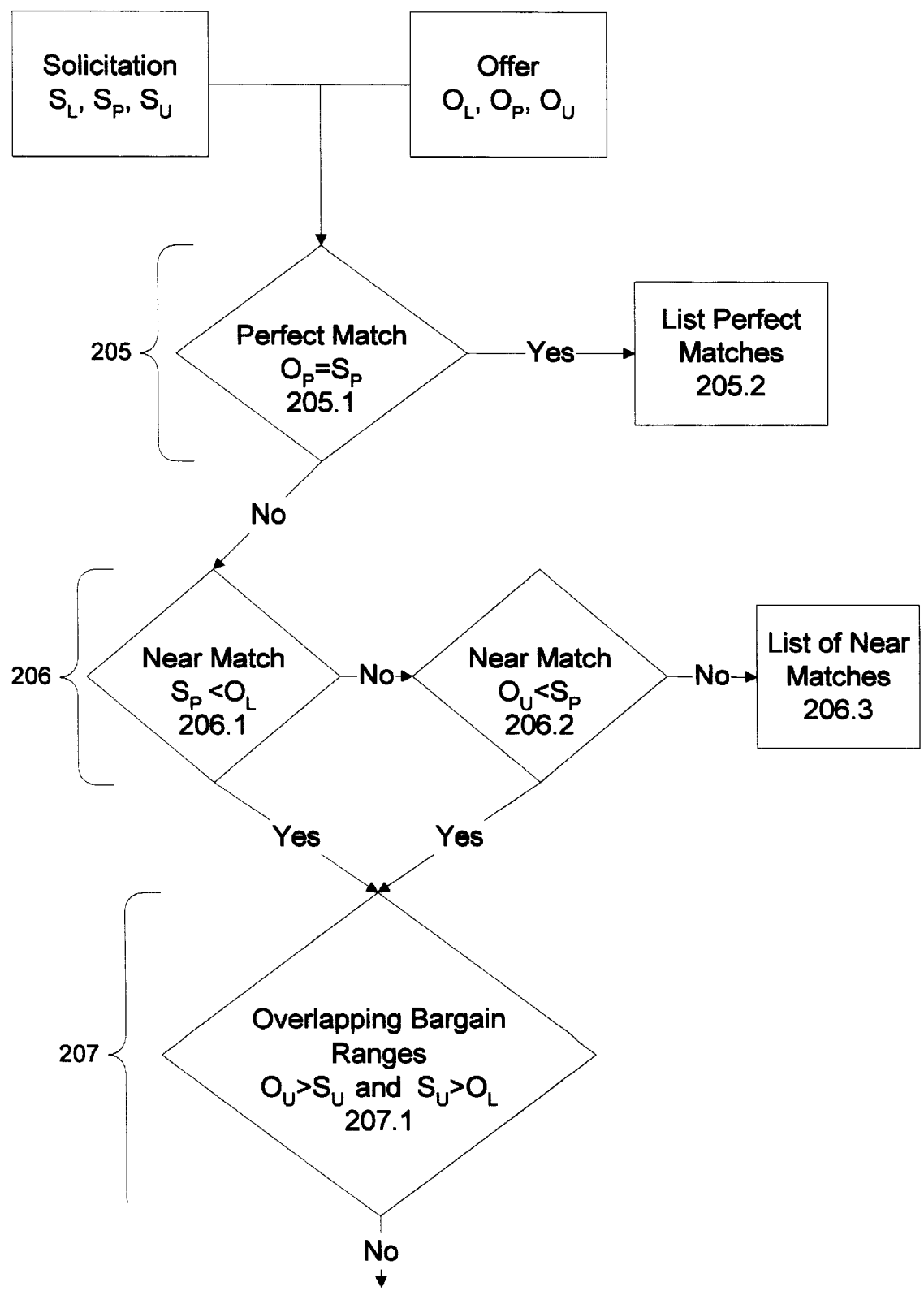

Fig. 2C  Levels of Matching
Level 205: Perfect Match
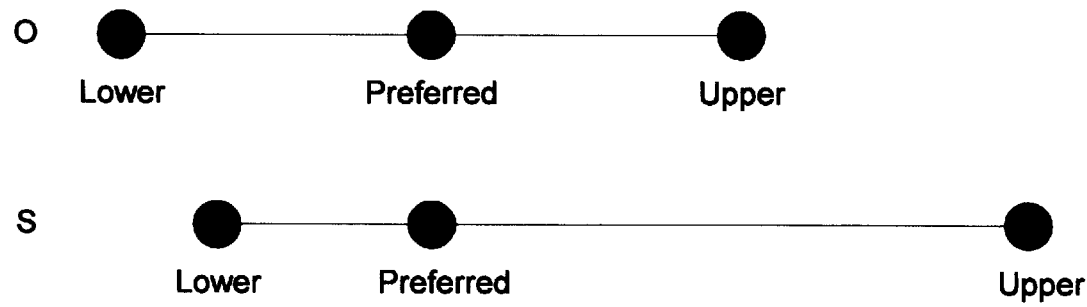
Level 206: Near Match
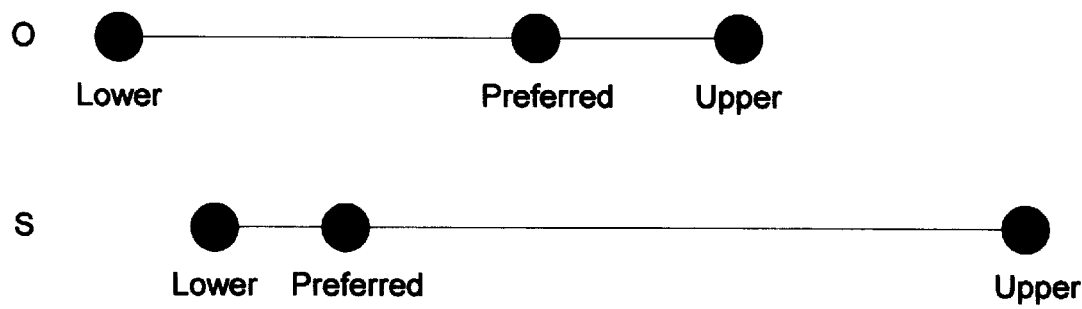

Fig. 2D  Levels of Matching
Level 207: Overlapping Bargaining Ranges
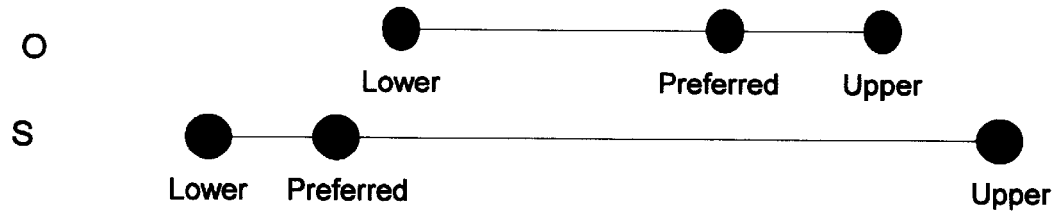
Examples:
207.1)
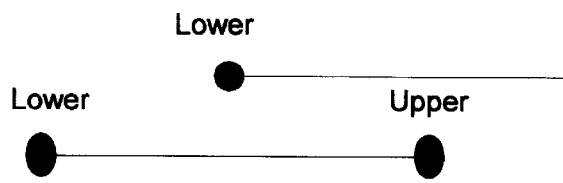
207.2)
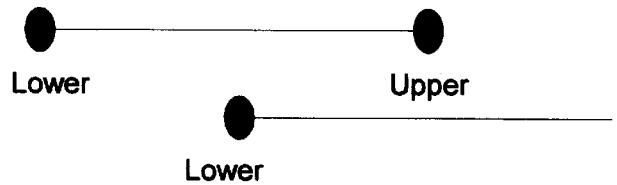
207.3)
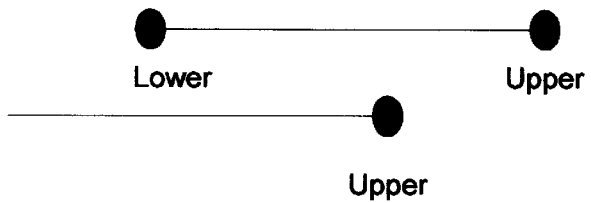
207.4)
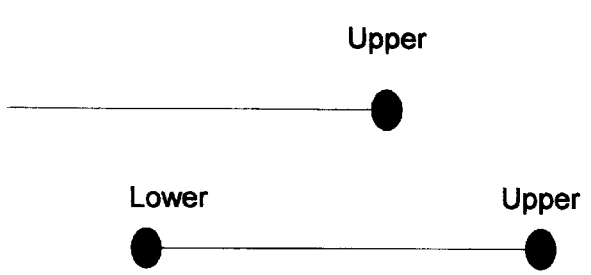

Fig. 2E
Level 208: No Common Bargaining Ranges
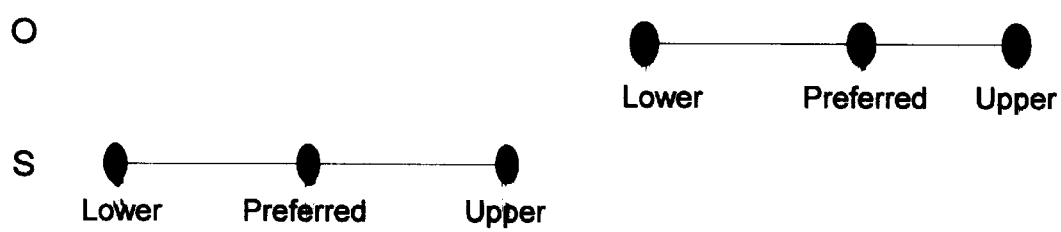
Or
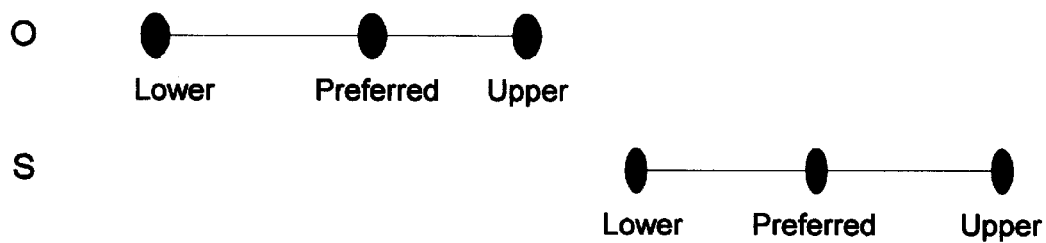

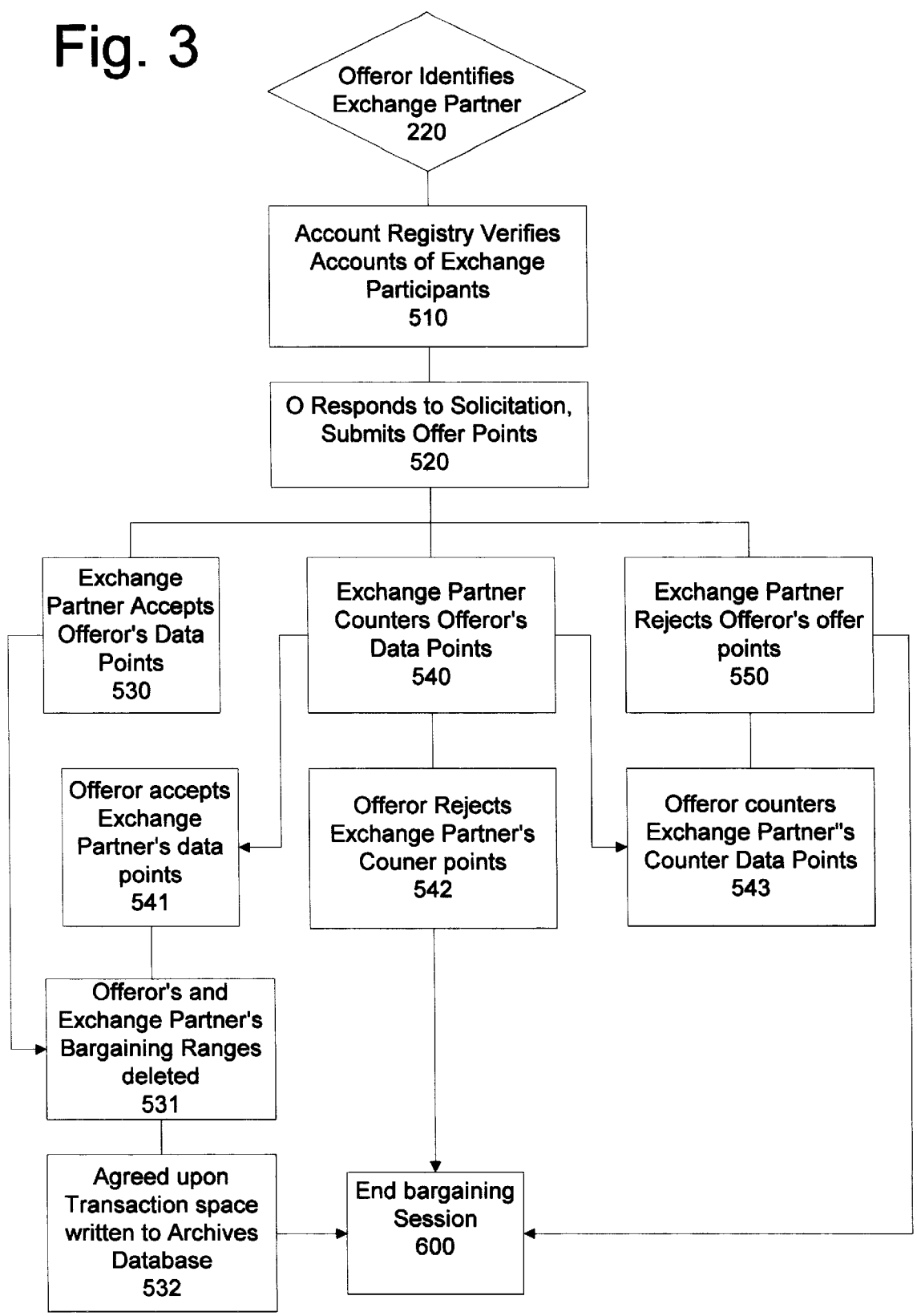

METHOD FOR AUTOMATICALLY IDENTIFYING, MATCHING, AND NEAR-MATCHING BUYERS AND SELLERS IN ELECTRONIC MARKET TRANSACTIONS

This application claims benefit to U.S. provisional application Serial No. 60/064,540 filed Nov. 5, 1997.

BACKGROUND OF THE INVENTION

This invention relates to a method for automatically identifying and matching buyers and sellers in proposed electronic commercial transactions.

The most basic modern embodiment of electronic commerce consists of a salesman using a telephone and a facsimile machine to negotiate a sale with a customer. In this system, two parties negotiate the various components of the transaction, which may include, among other things, the quantity of goods to be purchased, the performance specifications of the goods, the payment terms, and delivery requirements. If the parties are informed and efficient in their bargaining, a transaction may be completed with one phone call. If there is uncertainty or ignorance on either side of the transactions, several calls may be necessary to complete the transaction. The buyer may take time to solicit other sellers, shopping on the basis of price, availability, quality, and so on. The seller, in the meantime, may have to investigate logistics issues, discount pricing possibilities, or the quantity of the goods in inventory. These activities cost both parties time and money that could be better allocated to more profitable pursuits.

Conventional electronic commerce systems exist to automate the documentation aspects of administering a supply or distribution chain. In a retail sales environment, this means automating order placement and delivery of consumer goods. In an industrial, that is, business-to-business sales environment, this can include automating a buyer's or seller's inventory tracking and establishing electronic systems for electronic order placement to replenish inventory. Modern electronic commerce systems fall into three broad categories.

Conventional systems of electronic commerce fall into three categories based on the metaphor used: Catalogs, Store-and-Searches, and Electronic Data Interchanges (EDIs). Catalogs are systems of electronic commerce that enable vendors to sell their ware to buyers via various public networks, e.g. the Internet. Vendors display product descriptions in a catalog format; then, buyers browse through numerous product descriptions and place their orders electronically. Catalogs offer vendors and buyers the advantage of easy access to one another via one of several public networks. But Catalog systems have the disadvantages of being slow, time-intensive for the user, and burdensome to vendors regarding computational storage requirements. There is no negotiation process between vendor and customer, nor is there a method for automatically matching vendors and sellers.

Store-and-Search systems improve on the Catalog metaphor by using agents to simplify the shopping process. Buyers access agents over a proprietary network and use them to gather product information from vendors. Buyers may then sift through the information, make a purchasing decision, and complete the transaction electronically. Store-and-Search systems operate without monopolizing the users' time because agents perform the shopping function for the users. But Store-and-Search systems can lag in their responses to buyers. Additionally, Store-and-Search systems are processing intensive, impose burdensome computational storage requirements on vendors, do nothing to facilitate negotiation, and operate on a binary match/no match basis which excludes near-matches.

EDI systems consist of private network connections between buyers and vendors. These network connections are usually the product of a well-established relationship between the buyer and the seller. EDI systems do not facilitate shopping or information gathering; rather, they simply expedite order placement; thus, EDI offers few advantages to both buyers and vendors. Buyers can enjoy a customized, automated electronic order system, while vendors can establish predictable sales to existing EDI customers. These advantages come with significant disadvantages, including substantial dollar commitments to create the system, extensive user time commitments, and large computational storage requirements.

Though superior to the phone/facsimile system, these three conventional methods of electronic commerce offer limited practical advantages to their users. They all offer some degree of relief from the technical components of completing a sale. Mundane activities such as order placement or receipt and delivery are common among these systems. However, these systems vary in their sophistication and share common failings. Each system is slow, time-intensive, and expensive to initiate and maintain. Each one requires some familiarity among buyers and sellers to perform a transaction. Finally, these systems fail to provide an efficient, widely accessible, secure, and transaction-driven mechanism for conducting electronic commerce.

Existing electronic systems for selling fungible goods, futures contracts, options, and commodities most closely resemble an auction market. U.S. Pat. No. 3,581,072 to Nymeyer (1971) discloses a digital computer that matches orders and establishes market prices in an auction market for fungible goods. The computer generated automatic market pricing of goods, corrected for unpriced bids, recorded the transactions, and minimized human judgment in price calculations. As disclosed, this system suffers from serious omissions. First, price is the only transaction criteria used to determine compatibility of offers. Second, the computer does not accommodate users' internal computer and telecommunications systems. Third, the system completely omits logistics concerns from the assessment of compatibility. Fourth, the system does not accommodate differing payment terms among various buyers and sellers.

U.S. Pat. No. 4,789,928 to Fujisaki (1988) describes an auction information processing system. It allows buyers scattered over a wide area to participate in an auction in real-time and without gathering at an auction site. Several computers are linked by telephone lines and arranged in a hierarchical structure to expedite data transmission. These data consist of signals from a host to dealers and signals from various dealers and front computers to the host. The host conducts the auction by signaling start times, end times, and sell-offs. The dealer and front computers transmit bid signals from auction participants through several layers of front computers to the host. Product information is stored at the dealer level on laser discs. Price is determined by the competitive bidding occurring at the dealer level.

Like Nymeyer, Fujisaki does not address the other components of the transaction electronically. In an auction market the participants presumably know the rules or have made arrangements for delivery and payment; hence, these considerations are not a factor in the system. The auction market requires some planning as well. Sellers must transmit their product information well in advance of the auction itself. The system is not capable of accepting products for sale in real time. Additionally, the Fujisaki disclosure describes a market where one seller at a time markets to many buyers, and only one transaction may be completed at a time.

Prior art related to automated trading exchanges, like U.S. Pat. No. 4,903,201 to Wagner (1990) match bids to buy and sell on the basis of price and the terms of commodity contracts. Such disclosures are not designed to facilitate contract formation; thus, these disclosures do not provide a means for negotiation of terms. Likewise, such disclosures are not designed to facilitate contract execution. Thus, these disclosures do not provide a means for facilitating performance of a contract.

Prior art related to matching systems, such as U.S. Pat. No. 5,077,665 to Siverman et al. (1991), U.S. Pat. Nos. 4,412,287; 3,573,747; 3,581,072; and 4,674,044 implement matching systems, and Silverman incorporates broadcasting capabilities and suggests their use for disseminating market information.

None of these systems provide for buyer and seller interaction. Nor do these disclosures address the problems of contract negotiation, formation, or performance.

SUMMARY OF THE INVENTION

Accordingly, the present invention overcomes these problems by accomplishing the following objects:

a. providing exchange participants with prospective partners in an exchange without requiring the participants to physically gather and analyze information from secondary sources;
b. providing exchange participants with individual market summaries that describe the opportunity costs associated with a given transaction;
c. providing exchange participants with a system of electronic commerce that accommodates additional aspects of transactions other than price and quality;
d. providing a system of matching and bargaining based on the many variable dimensions of a transaction between market participants;
e. providing a system of matching participants that expedites contract formation;
f. providing a system of matching participants that streamlines the performance of an exchange;
g. providing a system that integrates with market participants' internal systems;
h. providing a system of matching participants that overcomes such barriers as differing languages, disparate units of measurement, and disparate units of currency;
i. providing a system of matching participants with differing network platforms, protocols, and system requirements;
j. providing a system of matching anonymous participants that arranges the performance of a negotiated exchange; and
k. providing a system of matching market participants that generates an auditable, unalterable record of offers and exchanges.

Additionally, the present invention provides a system for matching market participants that facilitates cross-country and cross-border trading without requiring the user to conduct time-consuming and costly investigation into the feasibility of an exchange. This enables participants to define their offers in terms of multiple dimensions with varying scales and creates a virtual marketspace that describes the opportunity costs inherent in the bargaining process. Further, this includes the literal performance of a given transaction by integrating logistics and financing products into the market.

Thus, these and other objects of the invention are satisfied by a computer implemented method for market participants for automatically identifying and matching offer data with solicitation data, the solicitation data stored in a solicitations data base, the method comprising the steps of: receiving offer data consisting of numerical linear ranges defining a lower point, an upper point, and a preferred point for each dimension of the offer data storing the received offer data in a database; comparing points for each dimension of the stored offer data to corresponding dimensions of the solicitation data to: identify solicitations with matching preferred points, identify solicitations with preferred points having a near match with the offer data when the upper point and the preferred point of the offer data are between the upper point and the preferred point of the solicitation data, and identify solicitations with preferred points within corresponding ranges to the offer data when at least one of the lower point, the upper point, and the preferred point of the offer data is between the lower point and the upper point of the solicitation data; transmitting the identified solicitations with matching preferred points, near matching preferred points, and preferred points within corresponding ranges to originator of the offer data.

Other objects of the invention are satisfied by a computer implemented system for identifying and matching buyers and sellers in electronic market transactions, the system comprising: a solicitation database containing solicitation data comprising: a party component, a product component, a logistics component, and a finance component, each component having multiple dimensions and each of the multiple dimensions expressed in a linear numeric scale; a participant interface enabling buyers and sellers to enter data into the solicitation database; an account registry linked to the solicitation database containing account information of the buyers and sellers, the account information comprising: account holder identification, bank information, and authorization agents; an archive database linked to the solicitation database and the account registry storing transaction contracts resulting from matching buyers and sellers and related contract logistics information derived from solicitation data and account information for the matching buyers and sellers; and a system gateway routing contract logistic information to buyers, sellers, and third parties.

Still other objects of the invention are satisfied by a system for facilitating transactions between participants comprising: a gateway computer; an interface connected to the gateway computer for receiving solicitation data from and sending solicitation and transaction data to the participants; an account registry database connected to the gateway computer for storing account information for each of the participants; a solicitation database connected to the gateway computer for storing solicitation data received from the participants; and computing means connected to the gateway computer, the account registry database and the solicitation database for matching solicitation data from the participants.

Further objects and advantages of this invention will become apparent to those skilled in the art from the following detailed description particularly in view of the accompanying Figures.

BRIEF DESCRIPTION OF THE DRAWINGS

FIG. 1a shows a market space for a given product.

FIG. 2 shows an overview of the process of matching a given offer with other corresponding solicitations.

FIGS. 2A–B show the tests used to compare offer data points with solicitation data points for matching.

FIGS. 2C–E show the various levels of matching data points

FIG. 3 shows the bargaining process and creation transaction points.

DETAILED DESCRIPTION OF THE INVENTION

Figure 1:
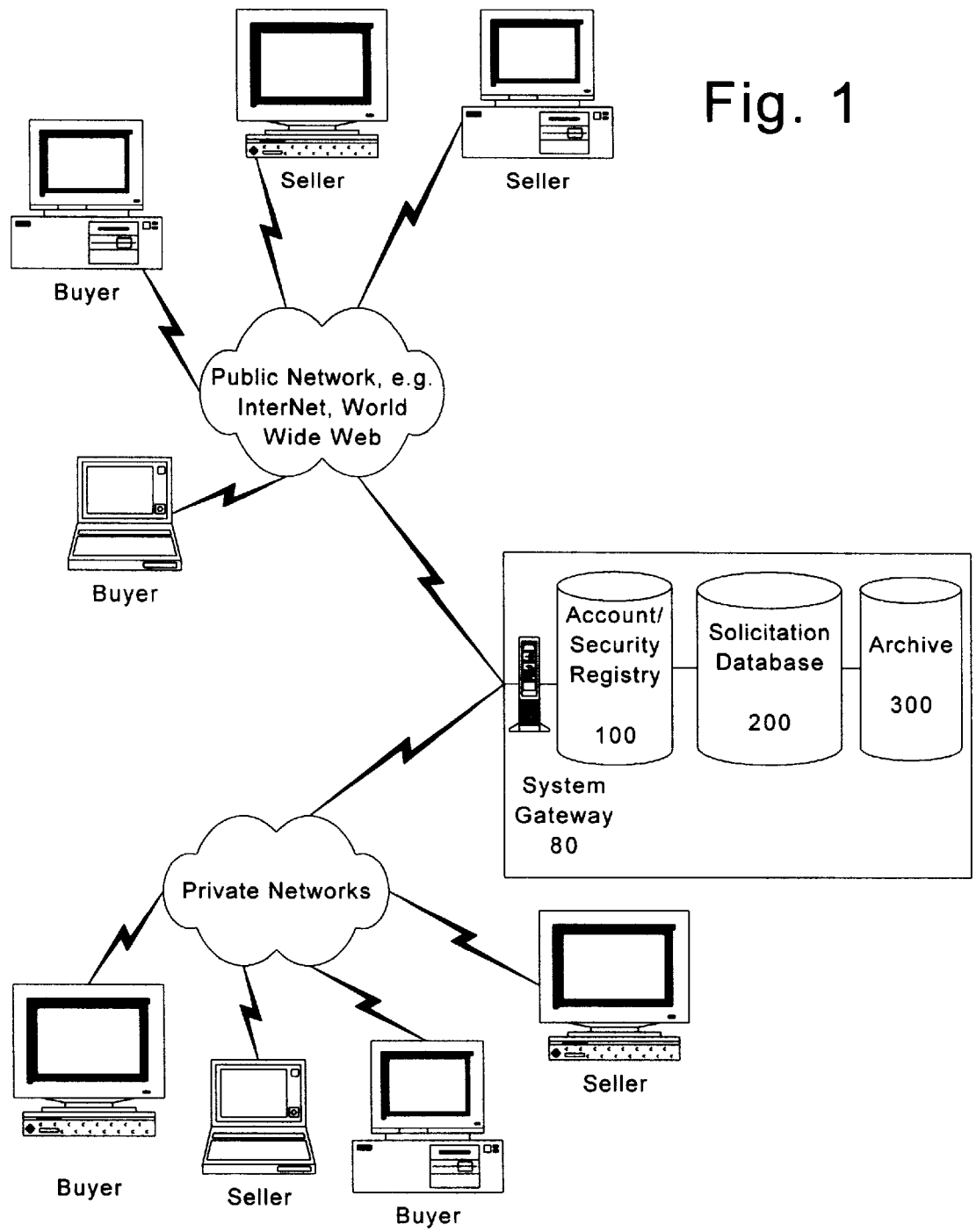
FIG. 1 is a diagram of the matching system.

An embodiment of the present invention is illustrated in FIG. 1. The present invention consists of a method of operating an electronic marketplace where a plurality of buyers and sellers access the marketplace using remote computers equipped via a direct dial up connection or any of a number of public and private computer networks. While the method of operating an electronic marketplace system described herein is directed toward a network (i.e. a local area network or a wide area network) of separate computers, the present system can be operated on any combination of computers or a single computer.

A system gateway 80 or market participant interface, which may be a separate computer or program on a single computer, controls entry and registration of buyers and sellers (market participants) into the marketplace. Information related to the registration of buyers and sellers, such as identity data, can be registered prior to or in conjunction with entry of offer or solicitation data. The participant interface can be configured to translate data from any format, language, etc. used by buyers and sellers into system readable data, i.e. translating the offer data and market data by formatting it into uniform, multidimensional data objects. Additionally, the system gateway 80 is responsible for transmitting transaction data to the market, i.e. the buyers and sellers.

Offer data from the originator's computer (the originator of offer data may be either buyers or sellers depending on the kind of transaction being brokered in the marketplace) flows to a computer server that functions as an account registry 100. The account registry 100 contains account information for each of the market participants, for example, the identities of registered users, user bank accounts, electronic mail addresses, and designated levels of selling and purchasing authority within the marketplace. This information may be stored in numerous forms; the preferred embodiment consisting of an object-oriented format. (The term "market participants" is intended to refer to originators of offer data and originators of solicitation data.)

Another computer server functions as a solicitation database 200. The solicitation database 200 contains all of the transaction solicitations data submitted by buyers and sellers for the market. Solicitation data are expressed in terms of multiple dimensions of a transaction. (The term "solicitation data" is used to refer to data from originators soliciting contracts existing in the solicitation database prior to the entry of offer data.) Offer data and solicitation data can involve buying or selling tangible goods, services, requests for proposals, requests for quotes, etc.; and can contain the following dimensions: a function identifier, a party identifier, a delivery destination, a product identifier, a price, a payment date, and an offer origination date. These components are expressed in numeric terms on a linear scale. For example, the Delivery Date component can consist of conventional calendar date formats converted into Julian dates plotted along an axis. Products are expressed in numerical form by using an accepted, linear coding system, such as the Standard Industrial Classification Code or the North American Industrial Classification System. Delivery Destinations, i.e. geographic areas, may be converted to linear numerical scales through the use of latitude and longitude conversions or Global Positioning System coordinates. Additionally, the participant interface can be configured to enable buyers and sellers to query the solicitation database 200 without submitting solicitation data.

A computing means that can be part of the system gateway 80, or mounted on a separate server or computer connected to the system gateway 80 communicates with the account registry 100, the solicitation database 200. This computing means is responsible for matching offer and solicitation data from market participants and notifying originators of the matching data of the results of any such matching operations.

Figure 1B:
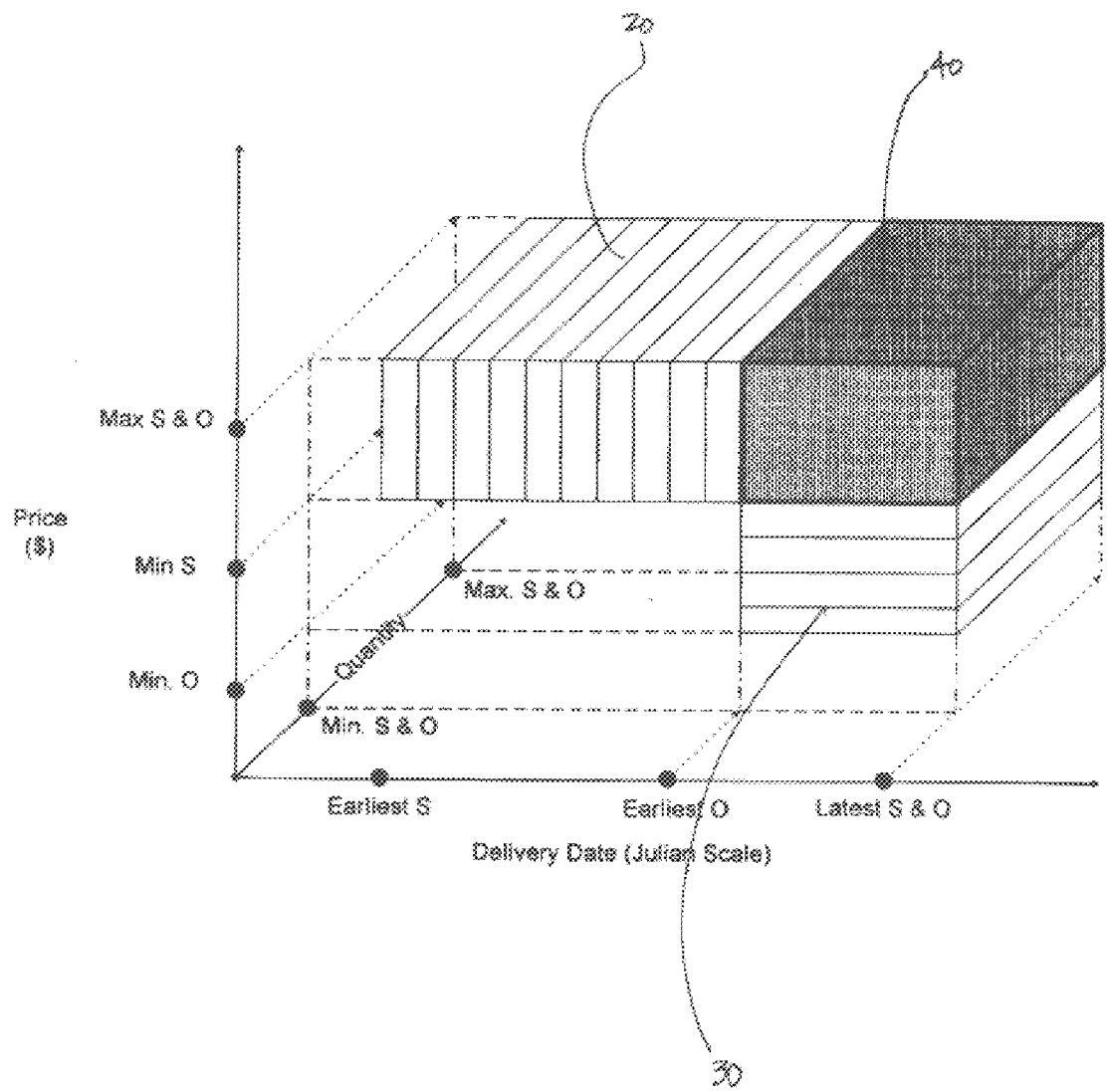
FIG. 1b shows a transaction space for a given product consisting of two intersecting bargaining ranges.

The geometric object 10 in FIG. 1a is a graphical expression of a market participant's simplified offer using price, delivery dates, and product quantity as the dimensions necessary to define his demand. In the preferred embodiment, an offer object may have a number of additional dimensions sufficient to completely describe the offer. FIG. 1b illustrates two such graphical expressions of solicitations 20, 30. The intersecting points of these two polyhedrons define the boundaries of negotiation 40 between the originator of the offer and the originator of the solicitation. The shaded polyhedron 40 is the transaction space, i.e. the space within which the parties can bargain to complete an exchange. These data are stored in the solicitation database. They may be stored in numerous forms, the preferred embodiment consisting of an object-oriented format.

Another server functions as the system's archive database 300. The archive database 300 contains a permanent record of all the completed negotiations taking place within the system. Exchange records include the parties' identity, the date of the exchange, the product, quantity, price, logistics information, and all other information relevant to the exchange. Transaction records stored in the system's archive database 300 may be stored in numerous forms common in the art.

The manner of using this matching system differs from others existing at present. As FIG. 2 illustrates, an originator of an offer enters the market 90 (standing solicitations) by sending multi-dimensional offer data 400 to the market's account registry 100 via the system gateway 80 or a computing means for comparison against a table of registered market participants. The participant may not access the system if his identity cannot be verified by the Account Registry 100. If the originator of the offer has his account verified, then the data 400 is written to the verification database 200.

As illustrated in FIG. 1a, the generic offer and solicitation each contain three dimensions: price, product quantity, and delivery date. In practical use, an offer and solicitation may contain any number of dimensions necessary to adequately describe features necessary to a particular marketplace. (See, for example, co-pending U.S. patent application Ser. No. 09/186,801, Attorney docket 15267-1, titled A Method for Communicating Information Inherent to Economic Transactions, J. O. Luke and S. M. Sweeney, filed Nov. 5, 1998). Each dimension has a linear scale upon which a range of transaction terms may be plotted. The product quantity dimension in FIG. 1a contains a point describing the maximum quantity desired, a preferred quantity desired, and a minimum quantity necessary to satisfy the party's needs. The delivery dimension can contain, for example and not limitation, a linear scale of Julian dates which enables the solicitor to plot a latest acceptable delivery date, a preferred delivery date, and an earliest acceptable delivery date. The price dimension contains a maximum point, a minimum point acceptable, and a preferred point. For the purpose of discussing this example, these three offer dimensions define the solicitor's "market" for a particular product. In the preferred embodiment, the market consists of as many dimensions as are necessary to accurately express the solicitation.

Returning to the discussion of FIG. 2, the computing means or the computer on which the solicitation database 200 is mounted sorts through standing solicitations submitted by market participants. Offer data 400 are compared to the standing solicitations data in the solicitation database 200 using searches to define the existing market space given the offer data. These searches involve comparing points for each dimension of the offer data to corresponding dimensions of the solicitation data to identify matching preferred points 205, identify near matching preferred points 206, identify preferred points within corresponding ranges 207, or identify preferred points within disparate ranges 208.

Figure 2B:
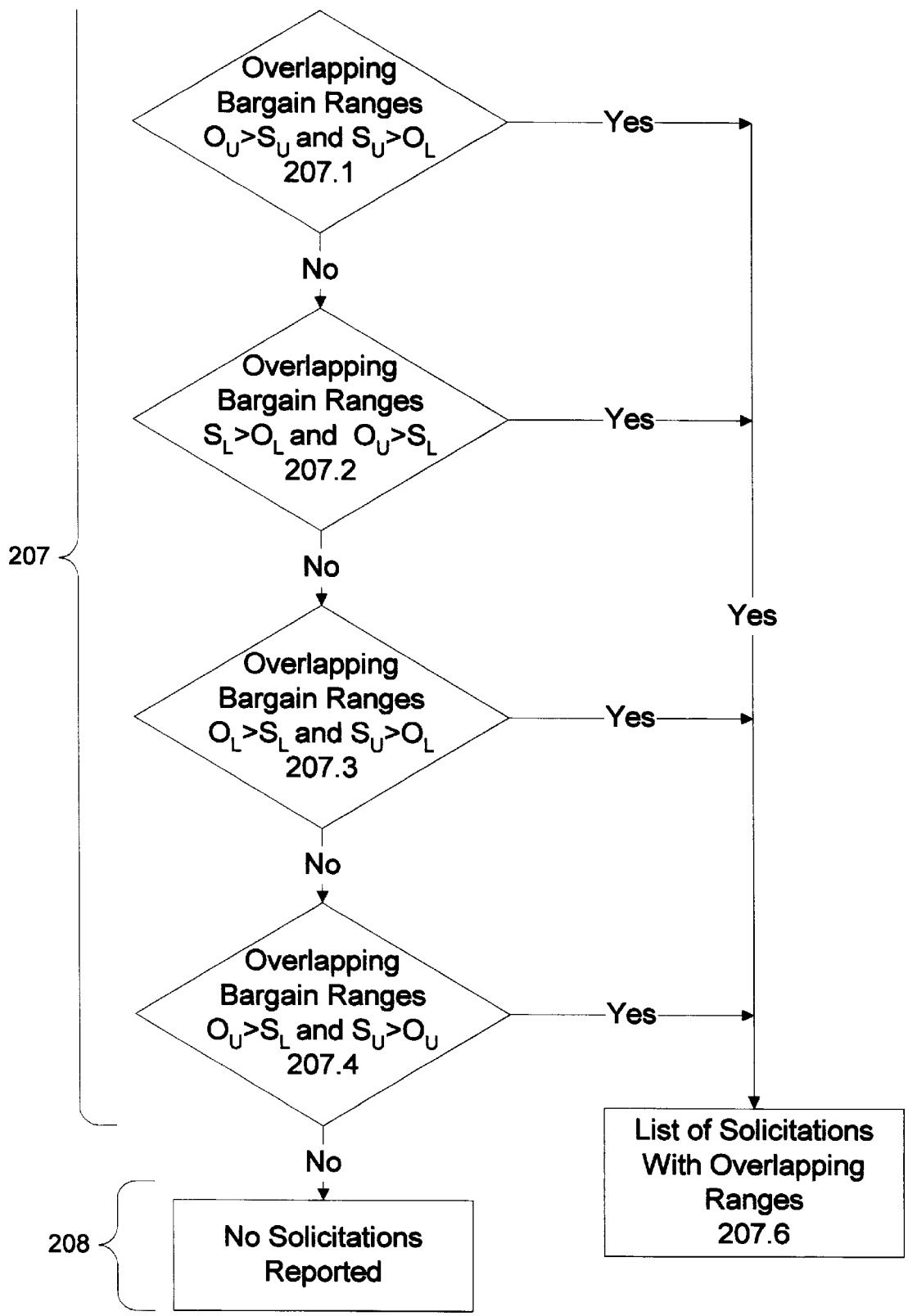

The algorithm for comparing points is illustrated in FIGS. 2A and 2B where each search is numbered to correspond to FIG. 2. The search operation begins by comparing each solicitor's preferred point $S_P$ from each solicitor's range $S_L$, $S_P$, $S_U$ . . . , with the offer data's preferred point $O_P$ from the offer data's range $O_L$, $O_P$, $O_U$, . . . (where the superscripts L, P, U, refer to lower, preferred, and upper points, respectively). (As used herein, outstanding offers, which may be buys, sells, requests for contracts or quotes, etc., already in the system are referred to as "solicitations" and new offers are referred to as "offers.") If two points are equal, then the preferred points plotted along that particular dimension are identical. FIG. 2C, level 205, illustrates a perfect match along one dimension. Any other result indicates that the preferred points do not correspond exactly. A perfect match is expressed mathematically as $$O_P = S_P \quad (205.1)$$

where O is offer data, S is solicitation data, and $_P$ indicates the preferred data point on a given dimension.

The present example illustrates an offer and solicitation as having only a single dimension for the sake of simplicity, i.e. O and S represent a single dimension of offer data compared to a single dimension of solicitation data. This example is in no way meant to limit the scope of the present invention. In fact, the invention is specifically meant to include multidimensional offer data and solicitation data that match exactly when the solicitation's preferred points and the offer data's preferred points are equal in all dimensions. That is the originator of the offer data and the originator of the solicitation data are in agreement on delivery destination, product, price, payment date, an offer origination date, etc., for example. The results of test 205 are output to a list of perfect matches 205.2. An exact match in every dimension would have congruent dimension ranges and preferred points.

All offers that drop through test 205 are then tested to see if they are near matches with any solicitations 206. The test is illustrated in greater detail in FIG. 2A 206. First, the offer's minimum data point, $O_L$, of a given dimension is compared to the solicitation's preferred data point, $S_P$, on the corresponding dimension. This is expressed mathematically as $$S_P < O_L \quad (206.1)$$

where O is offer data, S is solicitation data, $_L$ indicates the lower range limit, and $_P$ indicates the preferred data point.

If this is true, then the offer passes on to level 207 testing for overlapping bargain ranges. If this is not true, then a second test for the upper range of a near match is performed:

$$O_U < S_P \quad (206.2)$$

where O is offer data, S is solicitation data, $_U$ indicates the upper range limit, and $_P$ indicates the preferred data point.

If this is true, then the solicitation passes on to level 207 testing for overlapping bargain ranges. If this is not true, then the dimension is a near-match 206.3. That is the offer data's preferred point and upper limit fall within the preferred point and the upper limit of the solicitation data for the particular dimension being tested. FIG. 2C illustrates a near-match 206. A near match can also thought of as offer data and solicitation data that contain intersecting dimension ranges and incongruent preferred points.

When the offer data is not a near match, level 207 determines if the offer data and solicitation data have preferred points within corresponding ranges on a given dimension. Such data ranges indicate the possibility for agreement. The two-step tests 207.1, 207.2, 207.3, and 207.4 determine the extent and type of corresponding ranges, as illustrated in FIG. 2B. The tests are expressed mathematically as $$O_U > S_U; \text{ and } S_U > O_L \quad (207.1)$$

where O the offer data, S is solicitation data, $_U$ indicates the upper range limit, and $_L$ indicates the lower range limit (Test 207.1 is illustrated in both FIG. 2A and FIG. 2B.)

If both statements are true, then the solicitation is added to the list of level 207 matches. FIG. 2D, number 207.1 illustrates such an overlap. If not, the next pair of tests is applied:

$$S_L > O_L; \text{ and } O_U > S_L \quad (207.2)$$

If both statements are true, then the solicitation is added to the list of level 207 matches. FIG. 2D, number 207.2 illustrates such an overlap. If not, then the next pair of tests is applied:

$$O_L > S_L; \text{ and } S_U > O_L \quad (207.3)$$

If both statements are true, then the solicitation is added to the list of level 207 matches. FIG. 2D, number 207.3 illustrates such an overlap. If not, then the next pair of tests is applied:

$$O_U > S_L>; \text{ and } S_U > O_U \quad (207.4)$$

If both statements are true, then the solicitation is added to the list of level 207 matches. FIG. 2D, number 20.74 illustrates such an overlap. If not, then the solicitation neither matches nor overlaps the offer's bargaining range.

Together, the level 207 tests identify solicitation data with preferred points within corresponding ranges to the offer data. That is solicitation data where at least one of the lower point, the upper point, and the preferred point of the offer data is between the lower point and the upper point of said solicitation data. Or, the offer data and the solicitation data contain intersecting dimension ranges and incongruent preferred points.

Solicitations not classified as matches at levels 205, 206, or 207 have no potential for successful negotiation. Such disparate matches labeled level 208, are illustrated in FIG. 2E.

Solicitations that match the offer data's data points at levels 205, 206, and 207 of congruence (i.e., perfect match, near match, or overlapping bargaining ranges) are sorted, listed, and transmitted to the originator of the offer data according to their level of congruence (i.e. level 205 match on every dimension, level 205 match on some dimension with some level 206 matches, no level 205 matches, but some level 206 and level 207 matches, etc.).

Non-matching solicitations (level 208) are completely incongruent with the offer data's data points and ranges. Completely incongruent data, level 208 data, would not be reported or published to the originator of the offer data.

All solicitations in the market space match at level 205, 206, 207, or 208. The kinds of match are the market for the originator's offer data as shown in FIG. 2 step 209. The market space, i.e. all the identified solicitations ranked according to congruence is transmitted to the originator of the offer data. (Ranking according to congruence, for example, could involve ranking matched data in order of proximity between ranges of the stored solicitation data and preferred points of the offer data.) The originator programs his system to format and display the market space according to his needs at step 210. Of course, the originator may set levels of congruence overall, or levels of congruence for specific dimensions, or any combination, for example in order to help him identify an exchange partner, step 220.

FIG. 1*b* is an illustration of two solicitations that have partially congruent bargaining ranges 20 and 30. In FIG. 1*b*, the offer and solicitation have differing price ranges and delivery dates, but perfectly corresponding product quantity ranges and preferred points. The shaded area 40 is where the data intersect and where there is some willingness on the part of both parties to negotiate a transaction. These three offer categories comprise the market for the offer data.

If necessary to preserve the marketplace, the maximum and minimum ranges defined in the solicitation data may be withheld from the originator of the offer data. In which case the maximum and minimum expressions would remain in the solicitation database. Only the solicitation's preferred data points would be transmitted to the originator of the offer data for evaluation. This market information would be sent to the account registry 100 for delivery to the originator of the offer data. Optionally the internal computer system of the originator of the offer data formats bundled data points from matching solicitation data for display in the preferred fashion. The originator of the offer data then evaluates the matching solicitations and selects a desired exchange participant.

FIG. 3 illustrates the negotiation process employed by two parties, an orginator of offer data and an originator of solicitation data to create an exchange of goods, once the originator has identified solicitation data that fits his needs and identified an exchange partner 220. (See step 220 of FIG. 2. Once selected, the originator of the offer data sends his selection for a potential partner back to the account registry (100 in FIG. 1) for account verification 510.

The system submits the offer data in the form of numeric data points to the exchange participant 520, who evaluates the proposed transaction and either accepts 530, counter offers 540, or rejects 550 the proposition. (Evaluation of the proposed transaction by the originator of the solicitation data is accomplished in the same manner as the solicitation data was evaluated by the originator of the offer data: The offer data from the account 100 is sent to the originator of the solicitation data. Optionally the internal computer system of the originator of the data formats the data points of the offer data for display in the preferred fashion. The originator of the offer data then evaluates the offer and reaches a decision. Of course, the evaluation can be a fully automated transaction based on parameters chosen by the originator of the offer data or the solicitation data.) If the exchange participant, that is the originator of the solicitation data, accepts 530 the proposition, then the two parties have agreed to an exchange of resources based on the originator of the offer data's preferred points. Depending on the transaction, marketplace protocols, etc. both the offer data and solicitation data containing the bargaining ranges for participants of the exchange are deleted 531 from the solicitation database. The agreed upon transaction space, i.e. the terms of the transaction, are then written 532 in to the archive database (300 in FIG. 1).

If the exchange participant does not accept the proposition, then the exchange participant, i.e. originator of the solicitation data, may either reject 550 and terminate the negotiation 600 or he may counter offer 540 to the originator of the offer data for evaluation.

In FIG. 1*b*, the price and delivery ranges for the originator of the solicitation data diverge from the price and data ranges (i.e. dimensions) for the originator of the offer data, but not completely, as the shaded intersection point 40 illustrates. In FIG. 3, this new set of preferred data points data would travels through the account registry and be routed back to the originator of the offer data for consideration (not shown). The originator of the offer data may then choose to accept 541 the counter offer from the originator of the solicitation data, reject the counter offer 542 and terminate the negotiation 600, or reject the counter offer and create yet another counter offer 543 for the originator of the solicitation data to consider. This negotiation process may continue for as long as is necessary to reach agreement on the terms of an exchange.

Figure 4:
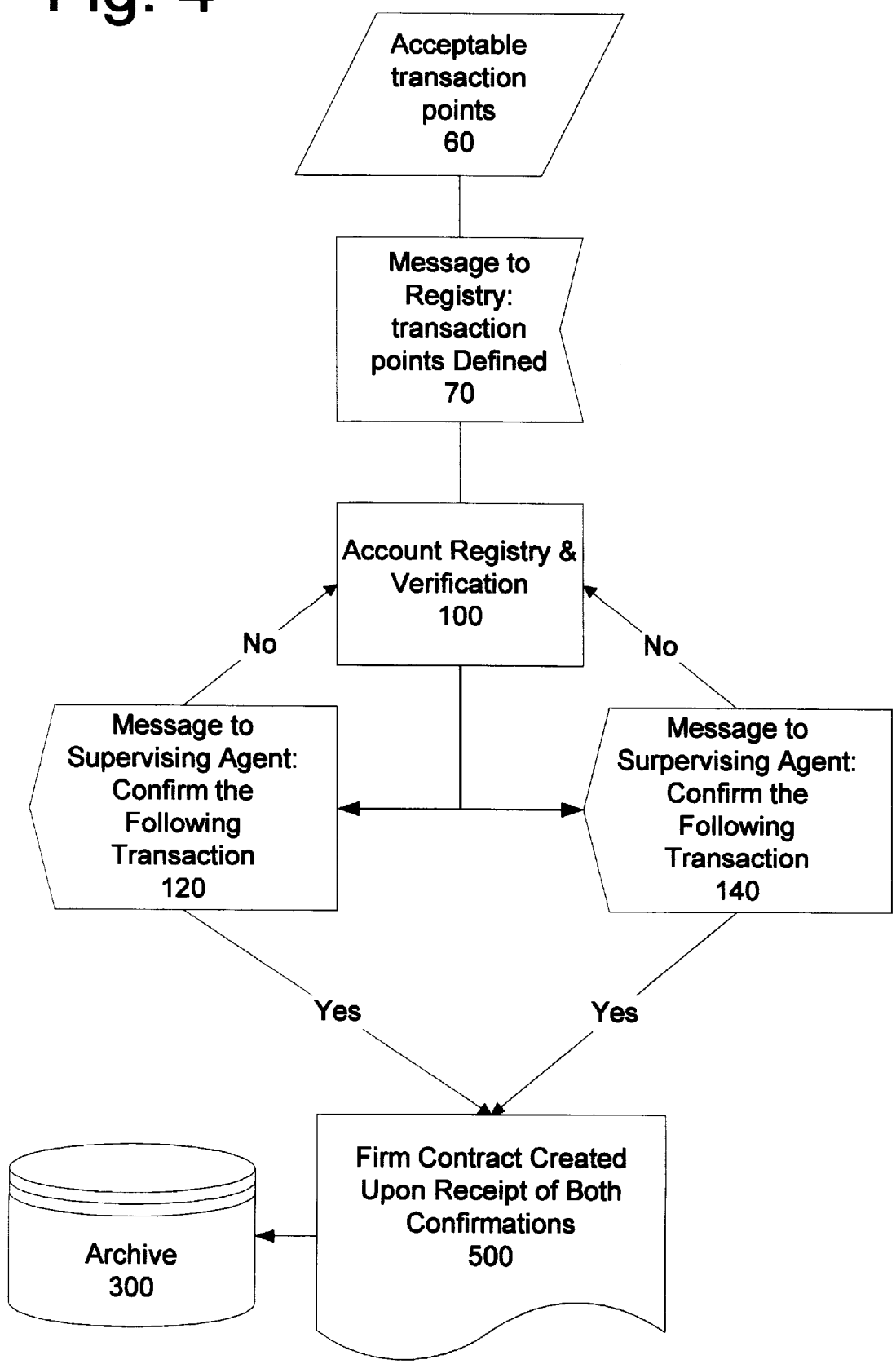
FIG. 4 shows the process of creating a firm contract between the exchange participants.

FIG. 4 illustrates the process of creating a firm contract within the matching system. When the exchange participant and the originator of the offer data reach agreement on the particulars of an exchange 60, each originator signals 70 the account registry 100 to inform the system of an impending contract formation. The account registry 100 then queries its records to determine the destination of confirmation messages from the matching system to the participants' supervisor agents. The account registry 100 contains a hierarchy of registered agents and the limitations of each agent's authority within the system. Limits upon the agents' authority may be expressed in terms of monetary floors or ceilings, specific product ranges, particular periods of time, and designated geographic regions. In the preferred embodiment, agents' authority limitations are expressed in real numeric values.

A message is sent to each participant's supervising agent 120, 140, e.g. a supervisor or controller, for authorization of the contract. Each supervisory agent may evaluate the offer data and either authorize the transaction or block the transaction. (Of course, the supervisory agent may be an individual or a virtual agent, or a combination of an individual/virtual agent, where the virtual agent can automatically approve transactions within preset parameters, for example, and the individual makes decisions for transactions outside the preset parameters.) If both supervisory agents authorize the contract, then the transaction information flows back to the Solicitation database, where the transaction receives a unique contract identification number.

In the preferred embodiment of the system, the logistics and finance dimensions of the transaction are formatted into offer data. The data are sent either directly to logistics and finance vendors for quotes or electronic markets for such services 600. The solicitation database server 200 or a main server, for example, sends the firm contract 500 to the archive 300 for permanent storage, while simultaneously deleting the posted solicitation from the solicitation database (see, 531 in FIG. 3).

Accordingly, the reader will see that the system for automatically identifying and matching buyers and sellers in electronic market transactions can expedite transactions by matching parties with compatible ranges on the many product dimensions, by furnishing users with a more accurate description of the market for a user's particular good or service, and by enabling the parties to bargain over exchange issues other than price. In addition, the matching system allows users to describe their products or services as completely as they wish through multi-dimensional offer objects and negotiation parameters. The matching system uses standardized, linear numeric scales to define offer dimensions, which allows users to convert offer data into any format within the users' internal systems. The matching system maintains a permanent record of all confirmed exchange agreements, which enhances record keeping and verification mechanisms for market participants. In addition, the system's Solicitation database analyzes the offer objects' logistics and finance dimensions and routes specific offer objects to logistics and finance vendors, thereby facilitating performance of exchanges formed within the system. Furthermore, the matching system has the following additional advantages:

- It matches market participants according to the congruence of preferred points between the offer data and solicitation data. This permits flexible matching of buyers and sellers based on the sum of an offer's dimensions as opposed to simply one dimension of a transaction e.g. price.
- It allows market participants to visually evaluate trade-offs and opportunity costs by displaying solicitation data to originator of the offer data as a collection of preference ranges plotted along a linear scale or a standardized hierarchical classification system converted to a linear scale.
- It allows for authorization of purchases and sales at additional levels of authority within a market participant's parent entity.
- It facilitates economic transactions without compromising valuable or useful information by transmitting data comprised of numbers that are meaningless when taken out of context.
- It allows electronic commerce to take place without consuming significant bandwidth because market participants submit offer and solicitation data as relatively compact offer objects.

Although the description above contains many specificities, these should not be construed as limiting the scope of the invention but as merely providing illustrations of some of the presently preferred embodiments of this invention. For example, offer data may be expressed in an object-oriented programming language and stored in an object-oriented database; different means of accessing the system include wireless and remote connections; market spaces and transaction spaces may be displayed in tabular form rather than graphical form, etc.

Thus the scope of the invention should be determined by the appended claims and their legal equivalents, rather than by the examples given.

What is claimed is:

1. A computer implemented method for market participants for automatically identifying and matching offer data with solicitation data, said solicitation data stored in a solicitations data base, said method comprising the steps of:

receiving offer data consisting of numerical linear ranges defining a lower point, an upper point, and a preferred point for each dimension of said offer data;

storing the received offer data in a database;

comparing points for each dimension of the stored offer data to corresponding dimensions of said solicitation data, said solicitation data consisting of numerical linear ranges defining a lower point, an upper point, and a preferred point for each dimension of said solicitation data, to:

identify solicitations with matching preferred points, identify solicitations with preferred points having a near match with said offer data when said upper point and said preferred point of said offer data are between said upper point and said preferred point of said solicitation data, and identify solicitations with preferred points within corresponding ranges to said offer data when at least one of said lower point, said upper point, and said preferred point of said offer data is between said lower point and said upper point of said solicitation data;

transmitting the identified solicitations with matching preferred points, near matching preferred points, and preferred points within corresponding ranges to an originator of said offer data.

2. The computer implemented method of claim 1, further comprising the steps of:

completing bargaining by receiving from originator of said offer data acceptance of one of the transmitted solicitations;

confirming transaction terms arising from the completed bargaining;

storing the confirmed transaction terms in an archive;

analyzing logistics and finance requirements imbedded in the confirmed transaction terms;

routing said logistics and finance requirements to logistics and finance vendors; and purging the solicitation database of the solicitations comprising the confirmed transaction terms arising from said completed bargaining process.

3. The computer implemented method of claim 2, further comprising the steps of:

receiving a counter-offer to one of the transmitted solicitations from originator of said offer data;

transmitting the received counter-offer to originator of the chosen solicitation;

completing bargaining by receiving acceptance of the transmitted counter-offer from originator of the chosen solicitation;

confirming transaction terms arising from the completed bargaining;

storing the confirmed transaction terms in an archive;

analyzing logistics and finance requirements imbedded in the confirmed transaction terms;

routing said logistics and finance requirements to logistics and finance vendors; and purging the solicitation database of the solicitations comprising the confirmed transaction terms arising from said completed bargaining process.

4. The computer implemented method of claim 1, wherein said market participants submit said offer data and said solicitation data through market participant interfaces executed on a computer, said market participant interfaces translating said offer data and said market data by formatting it into uniform, multidimensional, data objects.

5. The computer implemented method of claim 1, further comprising the steps of:
   verifying offer data against market participant account information stored in an account registry;
   accepting said offer data into said solicitation database;
   matching said offer data with stored solicitation data containing congruent dimension ranges and preferred points;
   matching said offer data with stored solicitation data containing congruent dimension ranges and incongruent preferred points;
   matching said offer data with stored solicitation data containing intersecting dimension ranges and incongruent preferred points; and
   ranking the matched data in order proximity between dimension ranges of said stored solicitation data and preferred points of said offer data.

6. The computer implemented method of claim 1, further comprising the steps of:
   displaying matching solicitation data to originator of said offer data;
   accepting from originator of said offer data a message identifying a corresponding offer over which to negotiate;
   notifying originator of the displayed matching solicitation data of said corresponding offer over which to negotiate from originator of said offer data;
   accepting a response from originator of the displayed solicitation data; and
   notifying said originator of said offer data of willingness of originator of the displayed solicitation data to negotiate.

7. The computer implemented method of claim 6, further comprising the steps of:
   transmitting counteroffers between originator of said offer data and originator of the displayed solicitation;
   accepting a signal from originator of said offer data and originator of the displayed solicitation indicating agreement upon terms and formation of a contract;
   transmitting confirmation notices to an agent for originator of said offer data and an agent for originator of the displayed solicitation;
   accepting acknowledgement of the transmitted confirmation notices from said agents;
   assigning a unique identification number to said contract; and
   storing said contract in an archive database.

8. The computer implemented method of claim 7, further comprising the steps of:
   isolating logistics components of said contract;
   analyzing dimensions of the isolated logistics components;
   labeling the analyzed dimensions with said unique identification number of said contract;
   formatting the labeled analyzed dimensions into a multi-dimensional logistics offer object;
   routing said multidimensional logistics offer object to a logistics gateway; and
   exporting said multidimensional logistics offer object through said logistics gateway to a logistics vendor.

9. The computer implemented method of claim 8, further comprising the steps of:
   isolating finance components of said contract;
   analyzing dimensions of the isolated finance components;
   labeling the analyzed dimensions with said unique identification number of said contract;
   formatting the labeled analyzed dimensions into a multi-dimensional finance offer object;
   routing said multidimensional finance offer object to a finance gateway; and
   exporting said multidimensional finance offer object through said finance gateway to a finance vendor.

10. A computer implemented system for identifying and matching buyers and sellers in electronic market transactions, the system comprising:
    a solicitation database containing solicitation data comprising: a party component, a product component, a logistics component, and a finance component, each component having multiple dimensions and each of said multiple dimensions expressed in a linear numeric scale;
    a participant interface enabling buyers and sellers to enter data into said solicitation database;
    an account registry linked to said solicitation database containing account information of said buyers and sellers, said account information comprising: account holder identification, bank information, and authorization agents;
    an archive database linked to said solicitation database and linked to said account registry for storing transaction contracts resulting from matching buyers and sellers and related contract logistics information derived from solicitation data and account information for said matching buyers and sellers;
    a computer means automatically matching buyers and sellers according to congruence of preferred points plotted along dimensions of components of said solicitation data; and
    a system gateway routing contract logistic information to buyers, sellers, and third parties.

11. The computer implemented system of claim 10, where said participant interface translates data in buyer or seller formatting into system-readable data.

12. The computer implemented system of claim 10, where said participant interface also enables buyers and sellers to query said solicitation database without submitting solicitation data.

13. The computer implemented system of claim 10, where said product component identifies a product chosen from the group consisting of tangible goods, services, requests for proposals, and requests of quotes.

14. A system for facilitating transactions between participants comprising:
    a gateway computer;
    an interface connected to said gateway computer for receiving multidimensional offer data and multidimensional solicitation data from and sending said solicitation data and transaction data to said participants, at least one dimension of each of said offer data and said solicitation data having an upper point, a lower point and a preferred point;
    an account registry database connected to said gateway computer for storing account information for each of said participants;

a solicitation database connected to said gateway computer for storing said solicitation data received from said participants; and computing means connected to said gateway computer, said account registry database and said solicitation database for matching said offer data with said solicitation data from said participants by comparing said dimensions.

16. The system for facilitating transactions of claim 14, where matching solicitation data is a perfect match between preferred points plotted along all dimensions of components of said solicitation data.

16. The system for facilitating transactions of claim 14, where matching solicitation data is a near match of preferred points plotted along all dimensions of components of said solicitation data.

17. The system for facilitating transactions of claim 14, where said computing means, said account registry database, and said solicitation database are all mounted on said gateway computer.

18. The system for facilitating transactions of claim 14, where matching solicitation data is solicitations with preferred points within corresponding ranges of said offer data.

19. The system for facilitating transactions of claim 14, where matching solicitation data is ranked in order of proximity between dimension ranges of said solicitation data and preferred points of said offer data.

* * * * *